(12) United States Patent
Boehlke

(10) Patent No.: US 8,660,219 B2
(45) Date of Patent: Feb. 25, 2014

(54) CIRCUIT AND METHOD FOR DISTINGUISHING BETWEEN AN OFDM SIGNAL AND A RADAR SIGNAL

(75) Inventor: Kenneth A. Boehlke, Portland, OR (US)

(73) Assignee: Summit Semiconductor LLC, San Jose, CA (US)

( * ) Notice: Subject to any disclaimer, the term of this patent is extended or adjusted under 35 U.S.C. 154(b) by 0 days.

(21) Appl. No.: 13/438,787

(22) Filed: Apr. 3, 2012

(65) Prior Publication Data

US 2013/0259165 A1  Oct. 3, 2013

(51) Int. Cl.
    *H04L 27/06* (2006.01)

(52) U.S. Cl.
    USPC ........... 375/340; 375/260; 375/316; 375/350; 455/63.1; 455/67.11; 455/69; 455/70; 455/454; 455/512; 455/522; 342/52; 342/57; 342/89; 342/137

(58) Field of Classification Search
    USPC ................. 375/260, 316, 340, 350; 455/63.1, 455/67.11, 69, 70, 454, 512, 522; 342/52, 342/57, 89, 137
    See application file for complete search history.

(56) References Cited

U.S. PATENT DOCUMENTS

| | | | |
|---|---|---|---|
| 4,181,910 A | 1/1980 | Hitterdal | |
| 7,701,382 B2 * | 4/2010 | Hansen | ........................... 342/52 |
| 7,715,801 B2 * | 5/2010 | Tsuruno | ........................ 455/69 |
| 2002/0163463 A1 | 11/2002 | Lajiness et al. | |

FOREIGN PATENT DOCUMENTS

| | | |
|---|---|---|
| JP | 2011-066851 A | 3/2011 |
| KR | 10-2007-0091984 A | 9/2007 |
| WO | 03-093860 A1 | 11/2003 |

OTHER PUBLICATIONS

International Search Report and Written Opinion for PCT/US2013/034554, completed Jun. 21, 2013, mailed Jun. 24, 2013, 7 pages.

* cited by examiner

*Primary Examiner* — Leon Flores
(74) *Attorney, Agent, or Firm* — Chernoff Vilhauer McClung Stenzel LLP

(57) ABSTRACT

A radar detector determines whether an input signal is an orthogonally frequency division multiplexed (OFDM) signal or a radar signal by applying at least first and second bandpass filtering operations having substantially non-overlapping passbands to the input signal, each filtering operation having a passband of width substantially less than a relatively large instantaneous bandwidth characteristic of an OFDM signal and substantially greater than a relatively small instantaneous bandwidth characteristic of a radar signal. The detector multiplies power levels of output signals of the first and second filtering operations to form a power product signal and compares the power level of the power product signal with a threshold level and providing an indicating signal in a first state if the power level of the power product signal exceeds the threshold level and otherwise providing said indicating signal in a second state.

20 Claims, 2 Drawing Sheets

Radar and OFDM Discriminator Block Diagram

CIRCUIT AND METHOD FOR DISTINGUISHING BETWEEN AN OFDM SIGNAL AND A RADAR SIGNAL

BACKGROUND OF THE INVENTION

The subject matter of this application relates to circuit and method for distinguishing between an orthogonally frequency division multiplexed (OFDM) signal and a radar signal.

In several digital modulation techniques, a group of consecutive data bits in an input data stream is represented by a symbol D. Different combinations of data bits are represented by different symbols. For example, in the case of the group being composed of two bits, there are four possible combinations and accordingly there are four different symbols. One common type of digital modulation employing four symbols is 4-level phase shift keying (QPSK), in which the four different symbols induce four equiangularly spaced values of phase displacement in the bandpass representation.

In the complex baseband representation, each symbol D is conventionally represented by a doublet (I, Q). The I and Q components of the symbol are applied to respective ports of a quadrature modulator that also receives a carrier signal and outputs a signal that is modulated in frequency and/or phase and/or amplitude in accordance with the values of the I and Q components.

Orthogonal frequency division multiplexing (OFDM) is a digital modulation technique in which an input data stream is decomposed into several subsidiary streams, each subsidiary stream is represented by a sequence of symbols, and the several sequences of symbols are used to modulate respective carriers of constant frequency. The modulated carriers are summed to produce a transmission signal, which is supplied to a transmitter antenna for transmission to a receiver antenna. Receivers equal in number to the carriers and tuned to the carriers respectively receive and detect the sequences of symbols. Each sequence of symbols is then used to recover the corresponding subsidiary data stream, and the subsidiary data streams are combined in order to recreate the original data stream. The carriers are sufficiently spaced in frequency that they are orthogonal, i.e. each receiver sees only its own carrier.

FIG. 1 illustrates in very simplified form a transmitter and receiver for use with OFDM. Referring to FIG. 1, the transmitter includes a fixed-frequency local oscillator 10 generating a carrier at constant frequency f and N (as many as 100) subcarrier channels 16, each of which includes a subcarrier oscillator 18 generating a subcarrier at a selected constant frequency F. The different oscillators $18_1$-$18_N$ operate at different respective, mutually orthogonal, frequencies F1-FN. Each subcarrier channel 16 also includes a quadrature phase shift key (QPSK) modulator 20 which modulates the subcarrier in phase based on the value of a two bit data word D to provide a QPSK modulated output signal and thereby encodes the subcarrier with the data word D.

The output signals of the subcarrier channels 16 are summed and the resulting composite subcarrier signal is mixed with the output signal of the local oscillator 10 to produce a transmission signal, which is supplied to a transmitter antenna 22 for transmission to a receiver antenna 24. The transmission signal includes signal components at frequencies (f+F1), (f+F2), . . . (f+FN). Thus, the transmission signal occupies a block of transmission frequencies from (f+F1) to (f+FN). The subcarrier frequencies F1-FN are chosen so that the transmission frequencies do not overlap and are sufficiently spaced to avoid interference.

A receiver that is connected to the receiver antenna 24 includes a receiver local oscillator 26 operating at the same constant frequency f as the transmitter oscillator 10. The receiver LO signal is mixed with the receiver antenna signal and provides an output signal that contains frequency components at the N subcarrier frequencies F1-FN respectively and is supplied to N receiver subcarrier channels 28, tuned to the subcarrier frequencies F1-FN respectively. Each receiver subcarrier channel includes a QPSK demodulator 30 that recovers the data words D that were encoded by the corresponding QPSK modulator 20.

It will be appreciated that although FIG. 1 illustrates separate functional blocks for the several functions that are performed by the transmitter and receiver, in practice many of the functions may be combined in a single digital signal processor.

One application of OFDM is in implementation of the standard commonly known as IEEE 802.11a-1999. IEEE 802.11a-1999, or simply 802.11a, prescribes the physical layer for a wireless local area network (WLAN) that operates in the 5 GHz frequency band (the middle range) of the Unlicensed National Information Infrastructure (U-NII) utilizing an OFDM-based air interface. In a typical implementation, the 802.11a signal occupies a bandwidth of at least 20 MHz. Extensions of the 802.11a standard, such as 802.11n and 802.11ac, allow multiple 20 MHz channels to be bonded together up to a bandwidth of 160 MHz.

Regulations effective in the United States require that a transmitter that operates in the middle range of the U-NII radio band should constantly monitor its radio channel for radar signals and move to another frequency channel when a radar signal has been detected. Some radar systems use a modulated single carrier waveform having a constant frequency whereas other systems use a signal that periodically sweeps through a range of frequencies. A radar detector must be able to detect both a single tone radar signal and a sweeping, or chirping, radar signal.

A conventional radar detector that may be used in an 802.11a wireless device may process incoming signals to identify pulses and classify the pulses based on the average logarithm of the pulse width and pulse repetition rate. A logarithmic PW/PRR mask of known radar types is applied to the average signal parameters and a radar detection is reported when a match is found. This approach is not able to differentiate between a radar signal and a signal having a similar pulse width and pulse repetition rate to a known radar type and may therefore lead to false radar detections.

SUMMARY OF THE INVENTION

It has been recognized that regardless of whether a radar system uses a modulated single carrier waveform or a sweeping frequency waveform, the radar signal occupies only a narrow range of frequencies at any one instant in time, and that this characteristic provides a basis for distinguishing between a radar signal and an 802.11a signal.

In accordance with a first aspect of subject matter disclosed herein there is provided a circuit for determining whether an input signal is an orthogonally frequency division multiplexed (OFDM) signal or a radar signal, the circuit having an input terminal for receiving the input signal and comprising at least first and second bandpass filters connected to the input terminal and each having a passband of width substantially less than a relatively large instantaneous bandwidth that characterizes the OFDM signal and substantially greater than a relatively small instantaneous bandwidth that characterizes the radar signal, the passbands of the first and second filters being substantially non-overlapping, a multiplier for multiplying a power level of an output signal of the first filter with a power level of an output signal of the second filter to form a power product signal, and a power level comparator for comparing a power level of the power product signal with a threshold level and providing an indicating signal in a first state if the power level of the power product signal exceeds the threshold level and otherwise providing said indicating signal in a second state.

In accordance with a second aspect of subject matter disclosed herein there is provided a circuit for distinguishing between a first signal having a relatively large instantaneous bandwidth and a second signal having a relatively small instantaneous bandwidth, the circuit having an input terminal for receiving an input signal and comprising at least first and second bandpass filters connected to the input terminal and each having a passband of width substantially less than said relatively large instantaneous bandwidth and substantially greater than said relatively small instantaneous bandwidth, the passbands of the first and second filters being substantially non-overlapping, a multiplier for multiplying a power level of an output signal of the first filter with a power level of an output signal of the second filter to form a power product signal, and a power level comparator for comparing the power level of the power product signal with a threshold level and providing an indicating signal in a first state if the power level of the power product signal exceeds the threshold level and otherwise providing said indicating signal in a second state.

In accordance with a third aspect of subject matter disclosed herein there is provided a method for determining whether an input signal is an orthogonally frequency division multiplexed (OFDM) signal or a radar signal, the method comprising applying at least first and second bandpass filtering operations to the input signal, each filtering operation having a passband of width substantially less than a relatively large instantaneous bandwidth characteristic of an OFDM signal and substantially greater than a relatively small instantaneous bandwidth characteristic of a radar signal, the passbands of the first and second filtering operations being substantially non-overlapping, multiplying power levels of output signals of the first and second filtering operations to form a power product signal, and comparing the power level of the power product signal with a threshold level and providing an indicating signal in a first state if the power level of the power product signal exceeds the threshold level and otherwise providing said indicating signal in a second state.

In accordance with a fourth aspect of subject matter disclosed herein there is provided a method for determining whether an input signal is a first signal having a relatively large instantaneous bandwidth or a second signal having a relatively small instantaneous bandwidth, the method comprising applying at least first and second bandpass filtering operations to the input signal, each filtering operation having a passband of width substantially less than said relatively large instantaneous bandwidth and substantially greater than said relatively small instantaneous bandwidth, the passbands of the first and second filtering operations being substantially non-overlapping, multiplying a power level of an output signal of the first filtering operation with a power level of an output signal of the second filtering operation to form a power product signal, and comparing the power level of the power product signal with a threshold level and providing an indicating signal in a first state if the power level of the power product signal exceeds the threshold level and otherwise providing said indicating signal in a second state.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
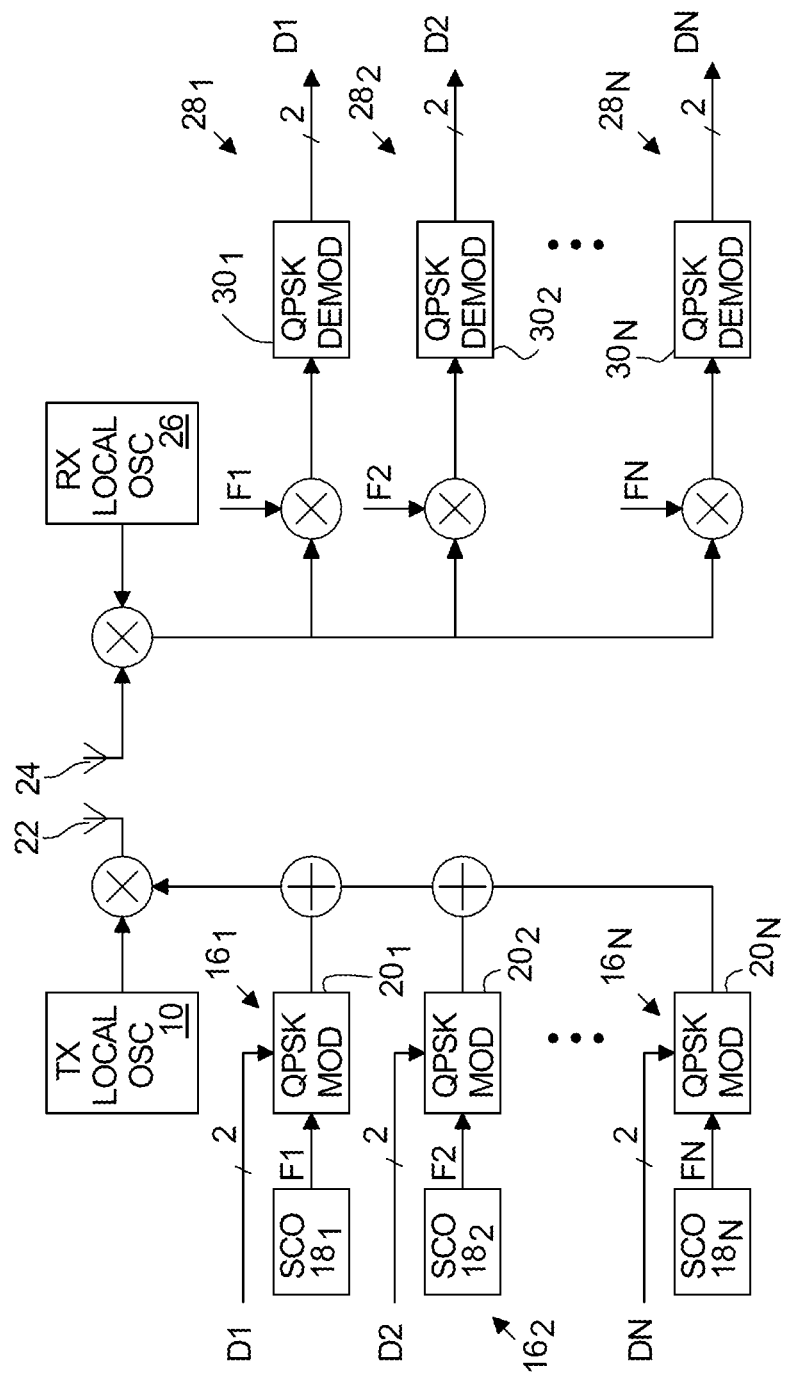
FIG. 1 is a schematic block diagram illustrating a conventional OFDM transmitter and receiver.
Figure 2:
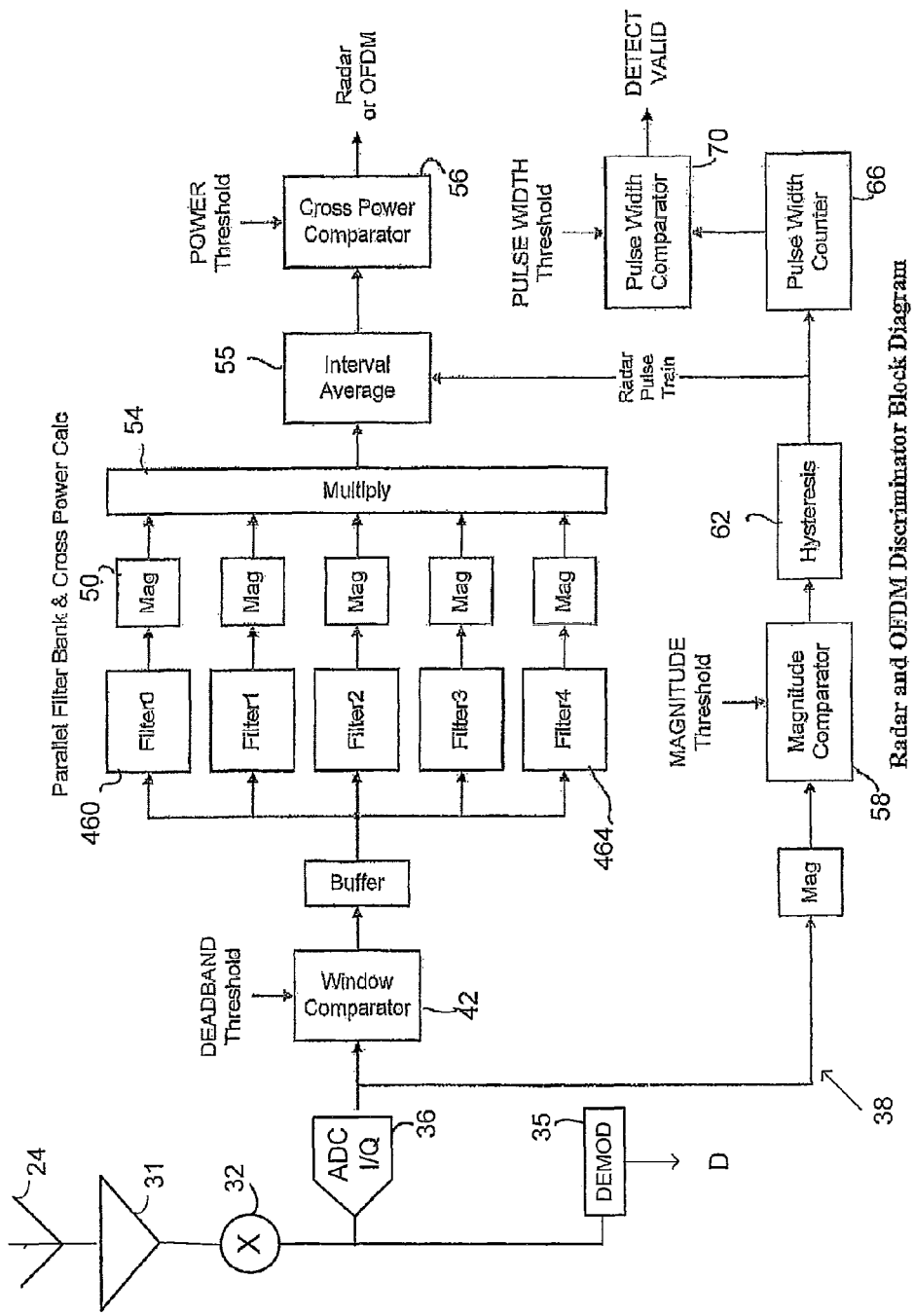
FIG. 2 is a schematic block diagram illustrating an OFDM receiver including a radar detector implementing subject matter disclosed in this application.

The OFDM receiver shown in FIG. 2 includes an antenna 24 on which an ambient electromagnetic signal induces an antenna signal that is amplified by a variable gain front end amplifier 31 and supplied to a downconverter 32, which mixes the amplified antenna signal with the LO signal provided by the receiver local oscillator 26 (not shown in FIG. 2) and outputs an intermediate frequency signal. The analog IF signal provided by the downconverter 32 comprises multiple frequency components, corresponding to the frequency components of the coded signals provided to the upconverter, each encoded with digital data words D. The analog IF signal is applied to an OFDM demodulator 35, which may be conventional, for recovering the data words D and is also applied to a radar detector 38. It will be appreciated that incoming signals received by the radar detector may be radar, OFDM or from another source.

The radar detector 38 operates intermittently, when the OFDM receiver is not transmitting a packet or the receiver is not expecting a packet. When the radar detector is not operating, the gain of the amplifier 31 is controlled in response to the OFDM receiving function of the OFDM receiver. When the radar detector is operating, the amplifier 31 operates with a high fixed gain. By amplifying the signal with a high gain in the radar detector mode, low amplitude signals are reliably detected. Because of the limited range of the ADC 36 and high fixed gain of the amplifier 31 high amplitude signals will be clipped, but this clipping does not affect the ability of the invention to discriminate radar from OFDM.

In an 802.11a implementation, the analog IF signal has a bandwidth of 20 MHz. The radar detector 38 includes an analog-to-digital converter (ADC) 36, which samples the IF signal at 40 MHz and quantizes the samples to produce a sequence of multi-bit signed digital words. In an implementation, the multi-bit words may be 12-bit words. The sequence of digital words constitutes a discrete digital signal that contains the frequency information present in the antenna signal supplied to the downconverter 32. Successive data words are processed as I and Q components of a complex data word.

The I and Q data words are applied to a window comparator 42 that compares each 12-bit data word with a positive threshold value and an equal and opposite negative threshold value and outputs a discrete ternary {−1, 0, +1} digital signal that depends on the result of the comparison. If a positive signed data word is more positive than the positive threshold value, the window comparator outputs a logical +1 digital value, if a negative signed data word is more negative than the negative threshold value, the window comparator limits output a logical −1 digital value, and if a signed positive or negative data value is between the positive and negative threshold values, the comparator outputs a logical 0 digital value.

The window between the negative and positive threshold values compensates for residual DC offset that may be present in the I and Q data words and may be set to 10% of full scale (+5% to −5%). Thus, even the small amplitude signals are of sufficient amplitude to cause the window comparator to output +1 or −1 digital value.

The window comparator effectively clips the I and Q data words and ensures that the power output of the window comparator has a narrower range than the IF signal. Although the window comparator clips the input signal, it will be appreciated that clipping does not alter substantially the single tone or multi-tone nature of the signal. Thus, clipping a sine wave generates odd harmonics of the input signal frequency but the third and fifth harmonics are low in power relative to the fundamental and have only a very minor impact on the power distribution. Clipping a multi-tone input signal generates an output signal similar to random white noise which has similar spectral properties to the original multi-tone input signal. Clipping of the I and Q data words does not affect significantly the frequency content of the signal.

Clipping of the data words by the window comparator normalizes the power of the output signal of the window comparator to the square of the positive (or negative) threshold value. Thus, the output of the window comparator is not affected by the fact that the output signal of the amplifier is also clipped.

The sequence of digital data words is buffered and applied to a bank of five digital filters 46 having effectively non-overlapping passbands. In an 802.11a implementation, each filter has a 4 MHz passband and the passbands of the five filters are from −10 to −6 MHz, −6 to −2 MHz, −2 to +2 MHz, +2 to +6 MHz and +6 to +10 MHz. Each filter provides an output signal representing the signal power present in its passband. The magnitudes of the output signals of the filters are calculated (block 50). Since the positive and negative values of the output signal of the window comparator are each of magnitude one, this step effectively provides an output value proportional to the square of output value provided by the window comparator. Thus, the output signal of the magnitude block $50i$ (i=0-4) is proportional to the power of the output signal of the filter $46i$. The output signals of the magnitude blocks are multiplied together (block 54) and the resulting product signal is applied to an interval average block 55.

The sequence of signed I and Q data words is applied to a magnitude comparator 58 which compares the magnitude of the input signal with a magnitude threshold value, which is nominally set to 50% of full scale. The output of the magnitude comparator goes high at the beginning of a signal event and goes low at the end of a signal event. In the case of an OFDM signal, the signal event is a packet having a minimum duration of 24 μs, as prescribed in 802.11a, whereas in the case of single pulse radar the signal events are pulses having a duration of 1-2 μs and in the case of chirping radar the signal events are pulses having a duration as long as hundreds of microseconds. The hysteresis block 62 suppresses spurious responses to rapid and brief changes in the level of the input signal. Thus, the output of the hysteresis block is a pulse having a duration corresponding to the duration of the current signal event. The output of the hysteresis block 62 is applied to the interval average block 55.

The interval average block averages the output signal of the multiplication block 54 over the duration of the current signal event to form an average power product value. A cross power comparator 56 compares the average power product value with a threshold value, which may be, for example, 12% of the full scale value.

The ambient signal received by the antenna during an interval in which the radar detector is operative may be a radar signal or, for example, an OFDM signal. Consider, for example, an OFDM signal having a bandwidth of 20 MHz and a total power of 20 units. Based on the nature of the OFDM signal, the power is uniformly distributed throughout the total bandwidth and the passband of each filter 46 contains 4 units of power. The average power product value over the five bands is 1024. On the other hand, the instantaneous bandwidth of a radar signal is much narrower than 20 MHz. Let us assume that half the power (10 units in the case of a signal whose total power is 20 units) is concentrated in the center band, the two adjacent bands each contain 3 units and the two outer bands each contain 2 units. The total power remains 20 units but the average power product value is 360. If the average power product value is less than the power threshold value, the output signal of the cross power comparator indicates radar. Otherwise, the output signal of the cross power comparator does not indicate radar.

The output of the hysteresis block 62 is also applied to a pulse width counter 66 which measures the duration of the signal event pulse. A pulse width comparator 70 compares the pulse duration count with a pulse width threshold value, which is nominally set to 18 μs. If the output signal of the pulse width comparator indicates a pulse width less than the threshold, the pulse is flagged as not OFDM. Such a pulse indicates that the signal event might be a single pulse radar signal and could be processed and classified using the conventional PW/PRR mask.

A pulse width greater than 18 μs indicates that the signal event could be OFDM or chirping radar. If the output signal of the cross power comparator is high, OFDM is indicated.

If the radar detector determines that the signal event is radar, the receiver transmits a signal to the transmitter indicating that the transmitter should move to another frequency channel.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. For example, although the subject matter has been described in connection with an implementation of 802.11a, the wider bandwidth of 802.11n or 802.11ac can be supported by implementing multiple radar discriminators each serving a 20 MHz sub-channel or by extending the range of the discriminator to the wider bandwidth, by using additional bandpass filters and/or bandpass filters with wider passbands, or a combination of both. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a non-exclusive sense that is not intended to exclude the presence of other elements or steps in a claimed structure or method.

The invention claimed is:

1. A circuit for determining whether an input signal is an orthogonally frequency division multiplexed (OFDM) signal or a radar signal, the circuit having an input terminal for receiving the input signal and comprising:

at least first and second bandpass filters connected to the input terminal and each having a passband of width substantially less than a relatively large instantaneous bandwidth that characterizes the OFDM signal and substantially greater than a relatively small instantaneous bandwidth that characterizes the radar signal, the passbands of the first and second filters being substantially non-overlapping, whereby an output signal of the first filter is independent of an output signal of the second filter, a first multiplier for calculating a power level of the output signal of the first filter, a second multiplier for calculating a power level of the output signal of the second filter, a third multiplier for multiplying the power level of the output signal of the first filter with the power level of the output signal of the second filter to form a power product signal, and a power level comparator for comparing a power level of the power product signal with a threshold level and providing an indicating signal in a first state if the power level of the power product signal exceeds the threshold level and otherwise providing said indicating signal in a second state.

2. A circuit according to claim 1, comprising a magnitude comparator for comparing the input signal with a threshold value and providing an output pulse of duration corresponding to a signal event duration, and an averaging circuit that receives the power product signal and is enabled by said output pulse, whereby the power level comparator compares an average power product value with said threshold level.

3. A circuit according to claim 1, comprising a window comparator interposed between the input terminal and the bandpass filters for comparing the input signal with positive and negative threshold levels and setting a constant power for the input signal transferred to the bandpass filters.

4. A circuit according to claim 1, for determining whether the input signal is an orthogonally frequency division multiplexed (OFDM) signal having an instantaneous bandwidth B1 or a radar signal having an instantaneous bandwidth B2, comprising:

N bandpass filters connected to the input terminal and each having a passband of width substantially equal to B1/N, where N is such that B1/N is substantially greater than B2, the passbands of the N bandpass filters each being within the instantaneous bandwidth B1 and the passbands of the N bandpass filters being substantially non-overlapping whereby output signals of the N bandpass filters are independent of each other, N multipliers for calculating respective power levels of the output signals of the N bandpass filters, and a power product multiplier for multiplying the power levels of the output signals of the N filters together to form said power product signal.

5. A circuit according to claim 1, comprising:

an input portion for receiving the input signal and sampling the input signal to provide a succession of samples of the input signal, and a window comparator for comparing each sample of the input signal with a positive threshold level and a negative threshold level and providing a discrete comparator signal in a first state if the sample is more positive than the positive threshold level, providing the comparator signal in a second state if the sample is more negative than the negative threshold level, and providing the comparator signal in a third state if the sample is between the positive and negative threshold levels, and wherein the window comparator is connected to supply the comparator signal to the first and second multipliers.

6. A circuit for distinguishing between a first signal having a relatively large instantaneous bandwidth and a second signal having a relatively small instantaneous bandwidth, the circuit having an input terminal for receiving an input signal and comprising:

at least first and second bandpass filters connected to the input terminal and each having a passband of width substantially less than said relatively large instantaneous bandwidth and substantially greater than said relatively small instantaneous bandwidth, the passbands of the first and second filters being substantially non-overlapping, whereby an output signal of the first filter is independent of an output signal of the second filter, a first multiplier for calculating a power level of the output signal of the first filter, a second multiplier for calculating a power level of the output signal of the second filter, a third multiplier for multiplying the power level of the output signal of the first filter with the power level of the output signal of the second filter to form a power product signal, and a power level comparator for comparing the power level of the power product signal with a threshold level and providing an indicating signal in a first state if the power level of the power product signal exceeds the threshold level and otherwise providing said indicating signal in a second state.

7. A circuit according to claim 6, comprising a magnitude comparator for comparing the input signal with a threshold value and providing an output pulse of duration corresponding to a signal event duration, and an averaging circuit that receives the power product signal and is enabled by said output pulse, whereby the power level comparator compares an average power product value with said threshold level.

8. A circuit according to claim 6, comprising a window comparator interposed between the input terminal and the bandpass filters for comparing the input signal with positive and negative threshold levels and setting a constant power for the input signal transferred to the bandpass filters.

9. A circuit according to claim 6, for determining whether the input signal has an instantaneous bandwidth B1 or an instantaneous bandwidth B2, comprising:

N bandpass filters connected to the input terminal and each having a passband of width substantially equal to B1/N, where N is such that B1/N is substantially greater than B2, the passbands of the N bandpass filters each being within the instantaneous bandwidth B1 and the passbands of the N bandpass filters being substantially non-overlapping whereby output signals of the N bandpass filters are independent of each other, N multipliers for calculating respective power levels of the output signals of the N bandpass filters, and a power product multiplier for multiplying the power levels of the output signals of the N filters together to form said power product signal.

10. A circuit according to claim 6, comprising:

an input portion for receiving the input signal and sampling the input signal to provide a succession of samples of the input signal, and a window comparator for comparing each sample of the input signal with a positive threshold level and a negative threshold level and providing a discrete comparator signal in a first state if the sample is more positive than the positive threshold level, providing the comparator signal in a second state if the sample is more negative than the negative threshold level, and providing the comparator signal in a third state if the sample is between the positive and negative threshold levels, and wherein the window comparator is connected to supply the comparator signal to the first and second multipliers.

11. A method for determining whether an input signal is an orthogonally frequency division multiplexed (OFDM) signal or a radar signal, the method comprising:
applying at least first and second bandpass filtering operations to the input signal, each filtering operation having a passband of width substantially less than a relatively large instantaneous bandwidth characteristic of an OFDM signal and substantially greater than a relatively small instantaneous bandwidth characteristic of a radar signal, the passbands of the first and second filtering operations being substantially non-overlapping, whereby an output signal of the first filtering operation is independent of an output signal of the second filtering operation,
calculating a power level of the output signal of the first filtering operation,
calculating a power level of the output signal of the second filtering operation,
multiplying the power levels of the output signals of the first and second filtering operations to form a power product signal, and
comparing the power level of the power product signal with a threshold level and providing an indicating signal in a first state if the power level of the power product signal exceeds the threshold level and otherwise providing said indicating signal in a second state.

12. A method according to claim 11, comprising comparing a magnitude of the input signal with a threshold value and providing an output pulse of duration corresponding to a signal event duration, and averaging circuit the power product signal over the duration of said output pulse, whereby an average power product value is compared with said threshold level.

13. A method according to claim 11, comprising comparing the input signal with positive and negative threshold levels and setting a constant power of the input signal transferred to the bandpass filtering operation.

14. A method according to claim 11, comprising:
receiving the input signal and sampling the input signal to provide a succession of samples of the input signal, and
comparing each sample of the input signal with a positive threshold level and a negative threshold level and providing a discrete comparator signal in a first state if the sample is more positive than the positive threshold level, providing the comparator signal in a second state if the sample is more negative than the negative threshold level, and providing the comparator signal in a third state if the sample is between the positive and negative threshold levels.

15. A method according to claim 11, for determining whether the input signal has an instantaneous bandwidth B1 or an instantaneous bandwidth B2, comprising:
applying N bandpass filtering operations to the input signal, each filtering operation having a passband of width substantially equal to B1/N, where N is such that B1/N is substantially greater than B2, the passbands of the N filtering operations each being within the instantaneous bandwidth B1 and the passbands of the N filtering operations being substantially non-overlapping whereby output signals of the N filtering operations are independent of each other,
calculating respective power levels of the output signals of the N filtering operations, and multiplying the power levels of the output signals of the N filtering operations together to form said power product signal.

16. A method for determining whether an input signal is a first signal having a relatively large instantaneous bandwidth or a second signal having a relatively small instantaneous bandwidth, the method comprising:
applying at least first and second bandpass filtering operations to the input signal, each filtering operation having a passband of width substantially less than said relatively large instantaneous bandwidth and substantially greater than said relatively small instantaneous bandwidth, the passbands of the first and second filtering operations being substantially non-overlapping, whereby an output signal of the first filtering operation is independent of an output signal of the second filtering operation,
calculating a power level of the output signal of the first filtering operation,
calculating a power level of the output signal of the second filtering operation,
multiplying the power level of the output signal of the first filtering operation with the power level of the output signal of the second filtering operation to form a power product signal, and
comparing the power level of the power product signal with a threshold level and providing an indicating signal in a first state if the power level of the power product signal exceeds the threshold level and otherwise providing said indicating signal in a second state.

17. A method according to claim 16, comprising comparing a magnitude of the input signal with a threshold value and providing an output pulse of duration corresponding to a signal event duration, and averaging the power product signal over the duration of said output pulse, whereby an average power product value is compared with said threshold level.

18. A method according to claim 16, comprising comparing the input signal with positive and negative threshold levels and setting a constant power of the input signal transferred to the bandpass filtering operation.

19. A method according to claim 16, wherein said input signal is a discrete signal and the method comprises:
receiving an ambient signal and sampling the ambient signal to provide a succession of samples of the ambient signal, and
comparing each sample of the ambient signal with a positive threshold level and a negative threshold level and providing the input signal in a first state if the sample is more positive than the positive threshold level, providing the input signal in a second state if the sample is more negative than the negative threshold level, and providing the input signal in a third state if the sample is between the positive and negative threshold levels.

20. A method according to claim 16, wherein said first signal has an instantaneous bandwidth B1 and the second signal has an instantaneous bandwidth B2 and the method comprises:
applying N bandpass filtering operations to the input signal, each filtering operation having a passband of width substantially equal to B1/N, where N is such that B1/N is substantially greater than B2, the passbands of the N filtering operations each being within the instantaneous bandwidth B1 and the passbands of the N filtering operations being substantially non-overlapping whereby output signals of the N filtering operations are independent of each other, calculating respective power levels of the output signals of the N filtering operations, and multiplying the power levels of the output signals of the N filtering operations together to form said power product signal.

* * * * *